United States Patent
Lee et al.

(10) Patent No.: US 9,420,572 B2
(45) Date of Patent: Aug. 16, 2016

(54) METHOD AND APPARATUS FOR TRANSMITTING CHANNEL STATE INFORMATION IN WIRELESS COMMUNICATION SYSTEM

(71) Applicant: LG ELECTRONICS INC., Seoul (KR)

(72) Inventors: Hyun Woo Lee, Anyang-si (KR); Hyuk Min Son, Anyang-si (KR); Hye Young Choi, Anyang-si (KR); Seung Hee Han, Anyang-si (KR); Jin Min Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 72 days.

(21) Appl. No.: 14/347,959

(22) PCT Filed: Sep. 20, 2012

(86) PCT No.: PCT/KR2012/007507
§ 371 (c)(1),
(2) Date: Mar. 27, 2014

(87) PCT Pub. No.: WO2013/048056
PCT Pub. Date: Apr. 4, 2013

(65) Prior Publication Data
US 2014/0241319 A1    Aug. 28, 2014

Related U.S. Application Data

(60) Provisional application No. 61/541,095, filed on Sep. 30, 2011, provisional application No. 61/547,046, filed on Oct. 14, 2011.

(51) Int. Cl.
*H04L 5/00* (2006.01)
*H04W 72/04* (2009.01)
*H04L 1/00* (2006.01)
*H04W 36/00* (2009.01)
*H04L 1/18* (2006.01)

(52) U.S. Cl.
CPC ......... *H04W 72/0413* (2013.01); *H04L 1/0026* (2013.01); *H04L 1/0027* (2013.01); *H04L 5/001* (2013.01); *H04L 5/0057* (2013.01); *H04L 5/0082* (2013.01); *H04W 36/0005* (2013.01); *H04L 1/0031* (2013.01); *H04L 1/1822* (2013.01)

(58) Field of Classification Search
None
See application file for complete search history.

(56) References Cited

U.S. PATENT DOCUMENTS

| | | | |
|---|---|---|---|
| 2011/0039568 A1* | 2/2011 | Zhang et al. | 455/452.1 |
| 2011/0083066 A1 | 4/2011 | Chung et al. | |
| 2011/0105107 A1* | 5/2011 | Kwon | H04W 48/08 455/422.1 |
| 2011/0134774 A1* | 6/2011 | Pelletier et al. | 370/252 |

(Continued)

FOREIGN PATENT DOCUMENTS

| | | |
|---|---|---|
| KR | 1020110013442 A | 2/2011 |
| KR | 1020110106167 A | 9/2011 |

(Continued)

*Primary Examiner* — Fan Ng
(74) *Attorney, Agent, or Firm* — Dentons US LLP

(57) ABSTRACT

Provided are a method and an apparatus for transmitting periodic channel state information (CSI) in a wireless communication system. User equipment activates an uplink (UP) semi-persistent scheduling (SPS) session allocated to a secondary cell (SCell), periodically transmits the periodic CSI through a physical uplink shared channel (PUSCH) to a base station on the basis of the UL SPS session allocated to the SCell, and releases the UL SPS session allocated to the SCell.

10 Claims, 9 Drawing Sheets

(56) References Cited

U.S. PATENT DOCUMENTS

| | | | |
|---|---|---|---|
| 2011/0222485 A1* | 9/2011 | Nangia et al. | 370/329 |
| 2011/0243066 A1* | 10/2011 | Nayeb Nazar et al. | 370/328 |
| 2011/0249578 A1* | 10/2011 | Nayeb Nazar | H04L 1/0027 370/252 |
| 2011/0269490 A1* | 11/2011 | Earnshaw et al. | 455/509 |
| 2012/0087254 A1* | 4/2012 | Yin et al. | 370/252 |
| 2014/0192771 A1* | 7/2014 | Jung et al. | 370/331 |

FOREIGN PATENT DOCUMENTS

| | | |
|---|---|---|
| WO | 2009123549 A2 | 10/2009 |
| WO | 2010105667 A1 | 9/2010 |
| WO | 2011-034321 A2 | 3/2011 |
| WO | 2011-085230 A2 | 7/2011 |

\* cited by examiner (b) MULTIPLE CCS (a) SINGLE CC ized to process and transmit various pieces of informa-
METHOD AND APPARATUS FOR TRANSMITTING CHANNEL STATE INFORMATION IN WIRELESS COMMUNICATION SYSTEM This application is a 35 USC §371 National Stage entry of International Application No. PCT/KR2012/007507, filed Sep. 20, 2012, and claims priority to U.S. Provisional Application Nos. 61/541,095, filed Sep. 30, 2011 and 61/547,046 filed Oct. 14, 2011, each of which are hereby incorporated by reference in its entirety.

BACKGROUND OF THE INVENTION

1. Field of the Invention

The present invention relates to wireless communications and more particularly, a method and apparatus for transmitting channel state information in a wireless communication system.

2. Related Art

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

A carrier aggregation (CA) which supports a plurality of cells may be applied in a $3^{rd}$ generation partnership project (3GPP) long-term evolution advanced (LTE-A). The CA may be referred to as another name such as a bandwidth aggregation. The CA refers to configuring a broadband by collecting one or more carrier having a bandwidth smaller than the broadband when a wireless communication system tries to support the broadband. The carrier which becomes a subject when collecting one or more carrier may use the bandwidth which is used in the existing system for backward compatibility. For example, in 3GPP LTE, the bandwidths of 1.4 MHz, 3 MHz, 5 MHz, 10 MHz, 15 MHz, and 20 MHz are supported, and in 3GPP LTE-A, the broadband of more than 20 MHz may be configured by using only the bandwidth of the 3GPP LTE system. Furthermore, the broadband may be formed by defining a new bandwidth without using the bandwidth of the conventional system as itself.

A user equipment (UE) may transmit various types of uplink control information. Uplink control information may include a scheduling request (SR), hybrid automatic repeat request (HARQ)-acknowledgement (ACK) signal, and channel state information (CSI) including such as a channel quality indicator (CQI), recoding matrix indicator (PMI), and rank indicator (RI), etc. In general, CSI has a lower priority than an SR or HARQ-ACK signal. Therefore, when simultaneous transmission of CSI and other uplink control information is needed, the CSI may in fact be dropped without being transmitted. Also, in the case of simultaneous transmission of the CSI among a plurality of configured serving cells, transmission of CSI of a specific serving cell may be dropped.

The LTE rel-10 system provides two types of CSI transmission methods. The UE may transmit periodic CSI through a physical uplink control channel (PUCCH) or aperiodic CSI through a physical uplink shared channel (PUSCH). The periodic CSI is transmitted continuously at regular intervals while the aperiodic CSI is transmitted according to a command of a base station.

A method for transmitting periodic CSI in an efficient manner is required.

SUMMARY OF THE INVENTION

The present invention provides a method and apparatus for transmitting channel state information in a wireless communication system. The present invention provides a method for transmitting periodic channel state information through a PUSCH. More specifically, the present invention provides a method for transmitting periodic channel state information based on an uplink (UL) semi-persistent scheduling (SPS).

In an aspect, a method for transmitting, by a user equipment (UE), periodic channel state information (CSI) in a wireless communication system is provided. The method includes activating an uplink (UL) semi-persistent scheduling (SPS) allocated to a secondary cell (SCell), transmitting periodic CSI to a base station periodically through a physical uplink shared channel (PUSCH) based on the UL SPS session allocated to the SCell, and releasing the UL SPS session allocated to the SCell. The SCell and a primary cell (PCell) configures a carrier aggregation (CA) system. The PCell is a cell in which the UE performs a radio resource control (RRC) connection with the base station. The SCell is at least one cell from among the remaining cells excluding the PCell in the carrier aggregation system.

In another aspect, a user equipment (UE) for transmitting periodic channel state information (CSI) in a wireless communication system is provided. The UE includes a radio frequency (RF) unit for transmitting or receiving a radio signal, and a processor connected to the RF unit, and configure to activate an uplink (UL) semi-persistent scheduling (SPS) allocated to a secondary cell (SCell), transmit periodic CSI to a base station periodically through a physical uplink shared channel (PUSCH) based on the UL SPS session allocated to the SCell, and release the UL SPS session allocated to the SCell, The SCell and a primary cell (PCell) configures a carrier aggregation (CA) system. The PCell is a cell in which the UE performs a radio resource control (RRC) connection with the base station. The SCell is at least one cell from among the remaining cells excluding the PCell in the carrier aggregation system.

Dropping of transmission of periodic channel state information can be minimized.

DESCRIPTION OF EXEMPLARY
EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). $3^{rd}$ generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LTE-A will be largely described, but the technical concept of the present invention is not meant to be limited thereto.

Figure 1:
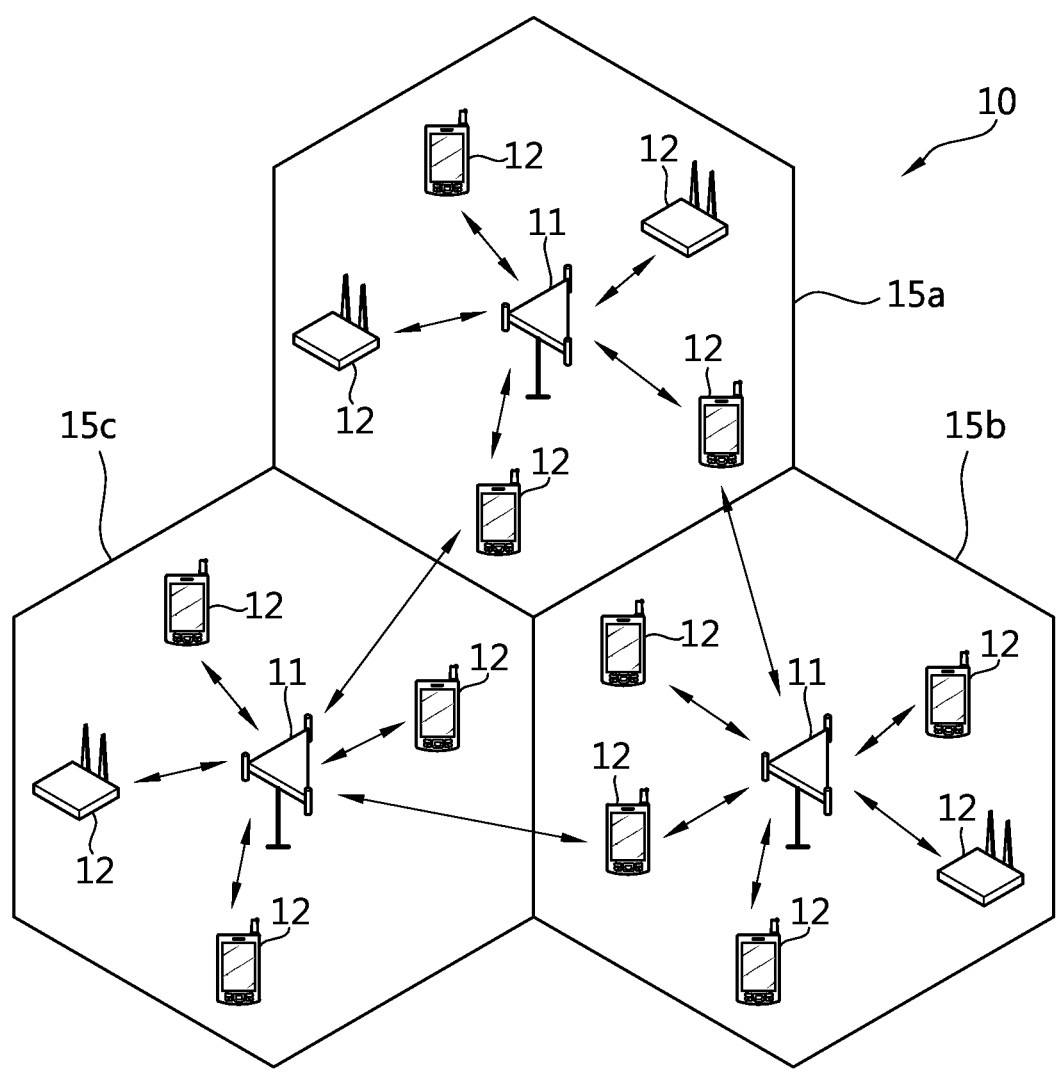
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink (DL) or uplink (UL). In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
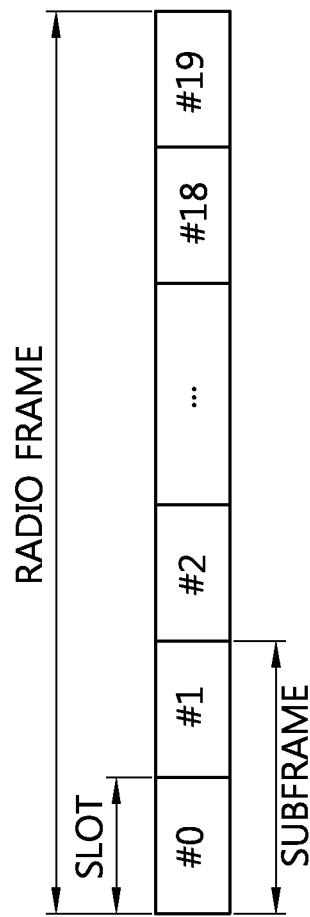
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A transmission time interval (TTI) is a basic scheduling unit for data transmission. In 3GPP LTE, one TTI may be equal to a time taken for transmitting one subframe. A radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
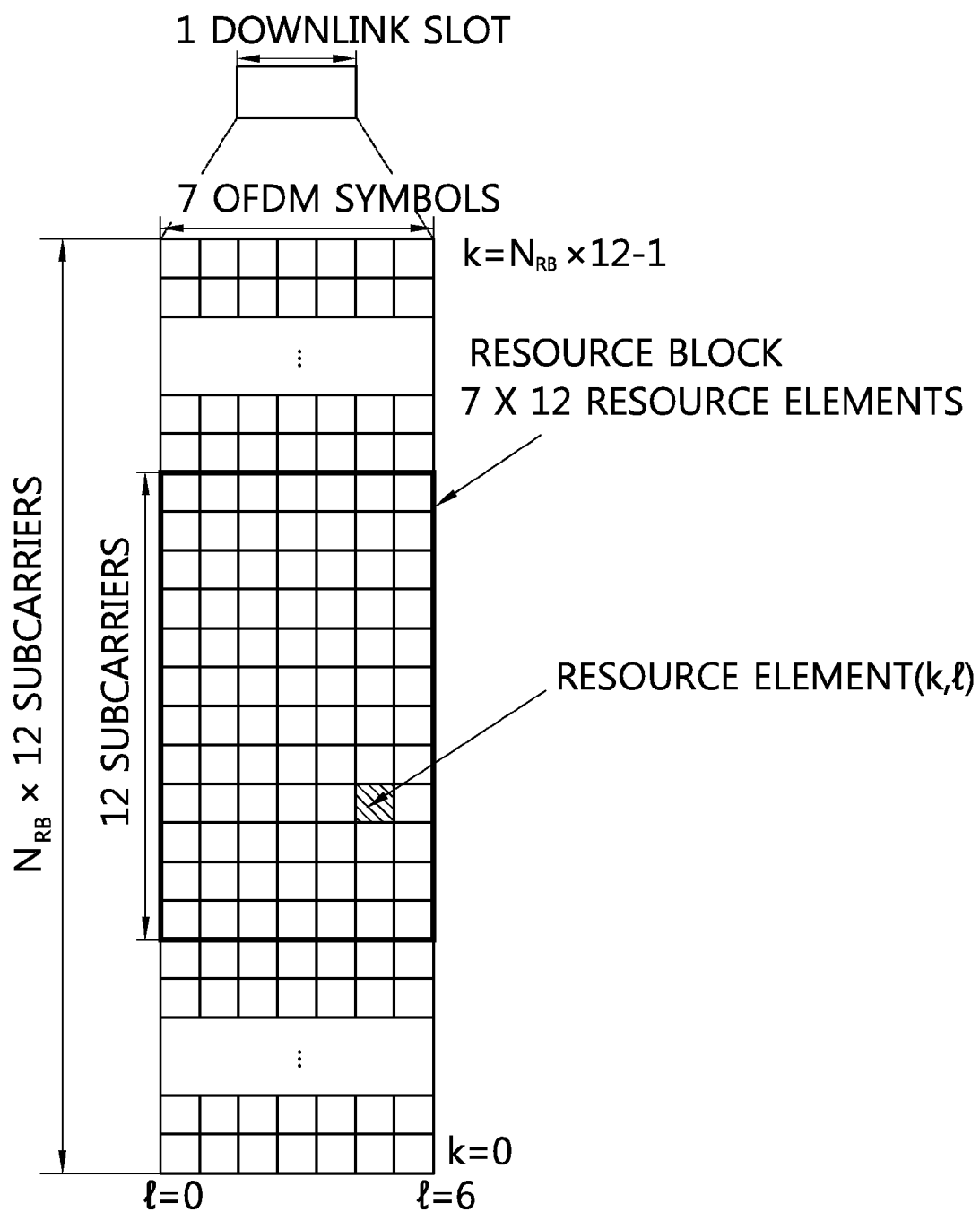
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB}\times12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
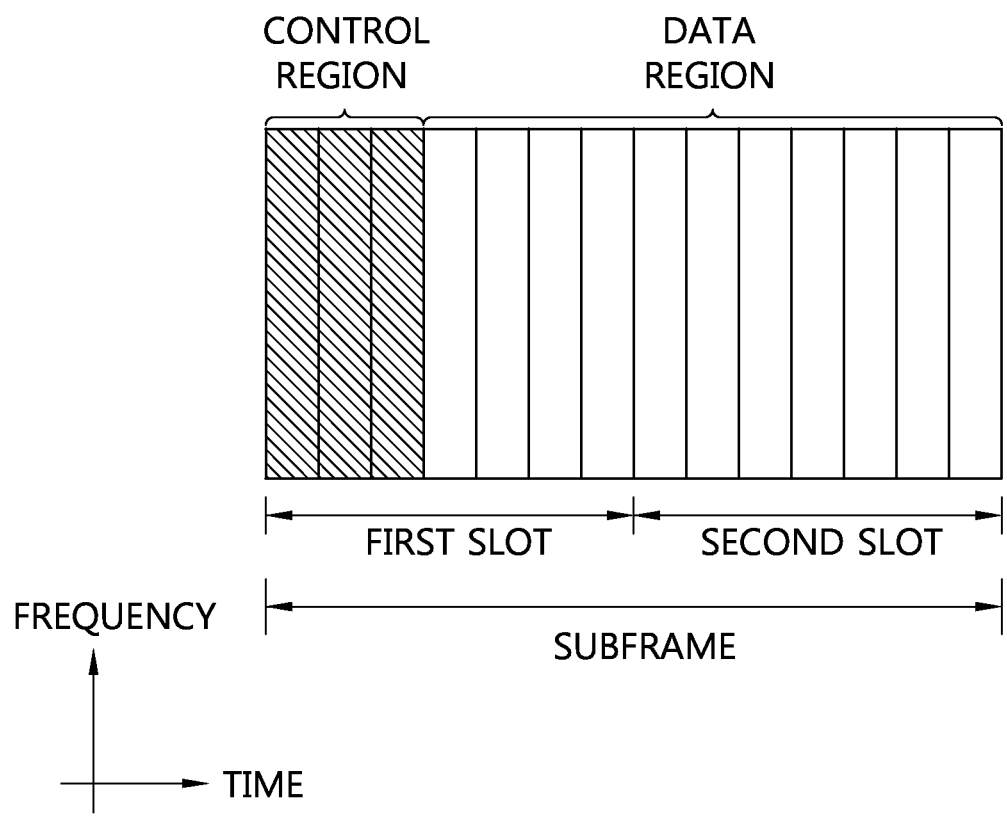
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to 9 resource element groups (REG) including respectively 4 resource elements. 4 quadrature phase shift keying (QPSK) symbols are mapped to each REG. Resource elements occupied by reference signals (RS) are not included in the REG, and the total number of REGs within a given OFDM symbol may be determined according to whether a cell-specific RS (CRS) exists. The format of the PDCCH and the number of bits of the possible PDCCH are determined according to the correlation between the number CCEs and the coding rate provided by the CCEs. The number of CCEs used for transmission of a specific PDCCH may be determined by the base station according to the channel situation. For example, the PDCCH for the UE having a superior channel state may use only one CCE. The PDCCH for the UE having an inferior channel state may need 8 CCEs in order to obtain sufficient robustness. Furthermore, the transmission power of the PDCCH may be adjusted according to the channel state.

The BS determines a PDCCH format according to a DCI to be transmitted to the UE, and attaches a cyclic redundancy check (CRC) to the DCI. A unique radio network temporary identifier (RNTI) is scrambled or masked on the CRC according to the owner or the purpose of the PDCCH. In case of a PDCCH for a particular UE, a unique identifier, e.g., a cell-RNTI (C-RNTI), of the UE, may be scrambled on the CRC. Or, in case of a PDCCH for a paging message, a paging indication identifier, e.g., a paging-RNTI (P-RNTI), may be scrambled on the CRC. In case of a PDCCH for a system information block (SIB), a system information identifier, e.g., a system information-RNTI (SI-RNTI), may be scrambled on the CRC. In order to indicate a random access response, i.e., a response to a transmission of a random access preamble of the UE, a random access-RNTI (RA-RNTI) may be scrambled on the CRC.

A restrictive set at the CCE position where the PDCCH may be located may be defined for each UE. The set of the CCE position where the PDCCH of each UE itself may be found is called a search space. The size of the search space is different according to the format of the PDCCH. The search space may be divided into a common search space (CSS) and a UE-specific search space (USS). The CSS is an area where the PDCCH which carries common control information is searched, and is a search area which is commonly configured for all UEs. The CSS is compose of 16 CCEs of CCE indexes 0 to 15, and may support the PDCCH of aggregation levels 4 and 8. However, the DCI format 0/1A which carries UE-specific control information may be transmitted through the CSS. The USS is a dedicated search space for a specific UE. The USS may support the PDCCH of aggregation levels 1, 2, 4, and 8. For one UE, the CSS may overlap with the USS.

The UE blind-decodes a DCI format which is transmitted from the base station. The blind decoding is a scheme of determining whether the PDCCH is the UE's own control channel by checking a CRC error by de-scrambling a desired identifier to the CRC of the received PDCCH. The UE does not know the position where the UE's PDCCH is transmitted within the control region, and the CCE aggregation level or DCI format which is used for the transmission. In order to reduce a calculation burden of the UE's blind decoding, the UE does not need to simultaneously search for all defined DCI formats. Generally, the UE may always search for the DCI format 0/1A in the USS. The DCI format 0 is used for the scheduling of the physical uplink shared channel (PUSCH). The DCI format 1A is used for the scheduling of the PDSCH and for the random access procedure which is initialized by the order of the PDCCH. The DCI format 0/1A may have the same size, and may be distinguished by a flag within the DCI format. Furthermore, the UE may be requested to further receive the DCI format 1/1B/2, etc, in the USS according to the PDSCH transmission mode which is configured by the base station. The UE may search form the DCI format 1A/1C in the CSS. Furthermore, the UE may be configured to search for the DCI format 3/3A, etc, in the CSS. The DCI format 3/3A has the same size as that of the DCI format 0/1A and may be distinguished by having a CRC which has been scrambled by the different identifiers. The UE may perform blind decoding up to 44 times within the subframe according to the transmission mode and the DCI format.

The control region of each serving cell is composed of a set of CCEs whose indexes are 0 to $N_{CCE,k}-1$, and $N_{CCE,k}$ is the total number of CCEs within the control region of subframe k. The UE may monitor the PDCCH candidate set as configured by the higher layer on one or more activated serving cells. At this time, the monitoring is an attempt of respectively decoding the PDCCH within the PDCCH candidate set according to all monitored DCI formats. Search space $S_k^{(L)}$ in aggregation levels 1, 2, 4, or 8 may be defined by the PDCCH candidate set.

Figure 5:
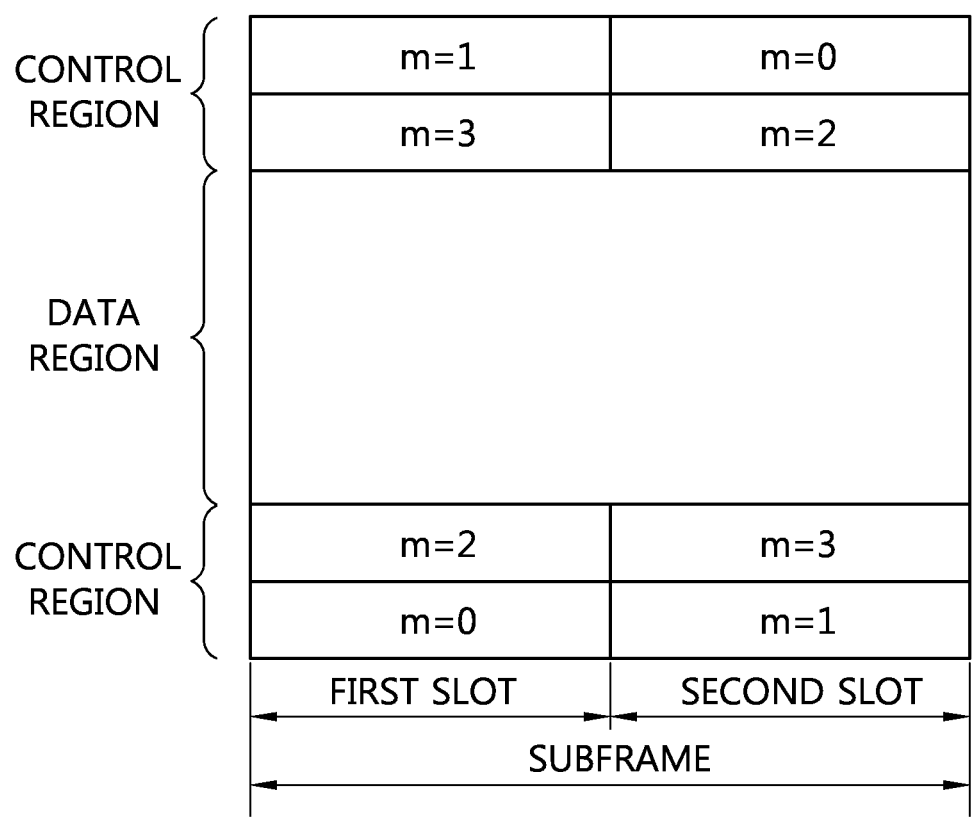
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR) indicating an uplink radio resource allocation request, and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

A carrier aggregation (CA) which supports a plurality of cells may be applied in a 3GPP LTE-A. A plurality of base stations and UEs may communicate through up to 5 cells. The 5 cells may correspond to the bandwidth of the maximum 100 MHz. That is, the CA environment indicates a case where a specific UE has two or more configured serving cells (hereinafter, referred to as "cell") having different carrier frequencies. The carrier frequency represents the center frequency of a cell.

A cell shows combination of DL resources and optionally UL resources. That is, the cell certainly includes DL resources, and the UL resources combined with the DL resources may be optionally included. The DL resources may be a DL component carrier (CC). The UL resources may be a UL CC. When a specific UE includes one configured serving cell, the UE may include one DL CC and one UL CC. When a specific UE includes two or more cells, the UE may include DL CCs whose number is the same as the number of cells and UL CCs whose number is the same as or smaller than the number of cells. That is, when CA is supported in the current 3GPP LTE-A, the number of DL CCs may always be the same as or greater than the number of UL CCs. However, in the release after 3GPP LTE-A, a CA where the number of DL CCs is smaller than the number of UL CCs may be supported.

The linkage between the carrier frequency of the DL CC and the carrier frequency of the UL CC may be indicated by system information transmitted on the DL CC. The system information may be a system information block type 2 (SIB2).

Figure 6:
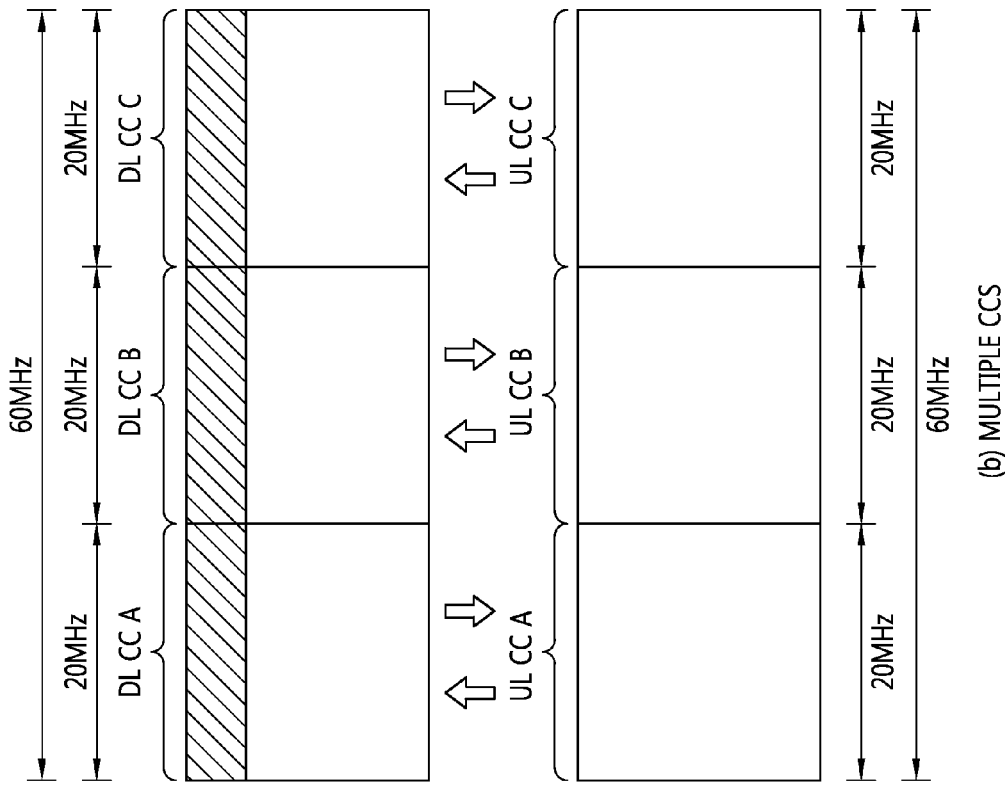
FIG. 6 shows an example of subframe structures of a single carrier system and a carrier aggregation system.
Figure 6:
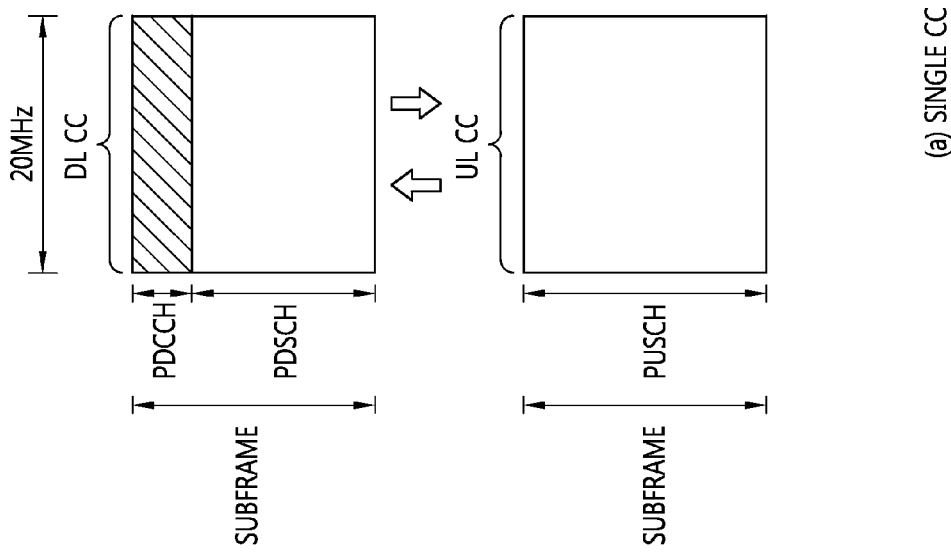

FIG. 6 shows an example of subframe structures of a single carrier system and a carrier aggregation system.

FIG. 6-(a) shows the single carrier system. It is assumed that a system bandwidth of FIG. 6-(a) is 20 MHz. Since the number of carriers is 1, each of a bandwidth of a DL CC transmitted by the base station and a bandwidth of a UL CC transmitted by the UE is also 20 MHz. The base station performs DL transmission through the DL CC and the UE performs UL transmission through the UL CC.

FIG. 6-(b) shows the carrier aggregation system. It is assumed that a system bandwidth of FIG. 6-(a) is 20 MHz. A downlink bandwidth is constituted by a DL CC A, a DL CC B, and a DL CC C which each have the bandwidth of 20 MHz. An uplink bandwidth is constituted by a UL CC A, a UL CC B, and a UL CC C which each have the bandwidth of 20 MHz. The base station performs the DL transmission through the DL CC A, the DL CC B, and the DL CC C and the UE performs the UL transmission through the UL CC A, the UL CC B, and the UL CC C. The DL CC A, the DL CC B, and the DL CC C and the UL CC A, the UL CC B, and the UL CC C may correspond to each other.

The UE may monitor and/or receive the DL signal and/or data transmitted from the plurality of DL CCs simultaneously. The base station may configure M DL CCs cell-specifically or UE-specifically so that the UE monitors only the DL signal and/or data transmitted from M DL CCs less than N DL CCs even though a cell manages N DL CCs. Further, the base station may configure L DL CCs cell-specifically or UE-specifically so as to monitor the DL signal and/or data transmitted from L DL CCs with priority among M DL CCs.

The UE which supports the CA may use a primary cell (PCell) and one or more secondary cells (SCell) for an increased bandwidth. That is, when there are two or more cells, one cell becomes a PCell, and the other cells become SCells. Both the PCell and the SCell may become a serving cell. The UE in the RRC_CONNECTED state where the CA is not supported or cannot be supported may have only one serving cell including only the PCell. The UE in the RRC_CONNECTED state which supports the CA may have one or more serving cells including the PCell and all SCells. Meanwhile, in the TDD system, the UL-DL configuration of all cells may be the same.

The PCell may be a cell which operates in a primary frequency. The PCell may be a cell where the UE performs radio resource control (RRC) connection with a network. The PCell may be a cell whose cell index is the smallest. The PCell may be a cell which tries a random access through a physical random access channel (PRACH) firstly among a plurality of cells. The PCell may be a cell where the UE performs an initial connection establishment process or a connection re-establishment process in a CA environment. Furthermore, the PCell may be a cell which is indicated in a handover process. The UE may obtain non-access stratum (NAS) mobility information (e.g., a tracking area indicator (TAI)) at the time of a RRC connection/reestablishment/handover through the PCell. Furthermore, the UE may obtain a security input at the time of RRC reestablishment/handover through the PCell. The UE may be allocated and transmit a PUCCH only in the PCell. Furthermore, the UE may apply system information acquisition and system information change monitoring only for the PCell. The network may change the PCell of the UE which supports the CA in the handover process by using RRCConnectionReconfiguration message including MobilityControlInfo.

The SCell may be a cell which operates in a secondary frequency. The SCell is used to provide additional wireless resources. The PUCCH is not allocated to the SCell. When adding the SCell, the network provides all system information related with the operation of the related cell in the RRC_CONNECTED state to the UE through dedicated signaling. The change of the system information for the SCell may be performed by a release and addition of the related cell, and the network may independently add, remove, or change the SCell through a RRC connection reestablishment process which uses RRCConnectionReconfiguration message.

The LTE-A UE which supports the CA may simultaneously transmit or receive one or a plurality of CCs depending on the capacity. The LTE rel-8 UE may transmit or receive only one CC when each CC is compatible with the LTE rel-8 system. Hence, when the number of CCs used in the UL is the same as the number of CCs used in the DL, all CCs need to be configured to be compatible with the LTE rel-8. Furthermore, in order to efficiently use a plurality of CCs, a plurality of CCs may be managed in a media access control (MAC). When the CA is formed in the DL, the receiver in the UE should be able to receive a plurality of DL CCs, and when the CA is formed in the UL, the transmitter in the UE should be able to transmit a plurality of UL CCs.

As a CA environment is introduced, cross carrier scheduling may be applied. Through the cross carrier scheduling, the PDCCH on a specific DL CC may schedule the PDSCH on one DL CC among a plurality of DL CCs or schedule the PUSCH on one UL CC among a plurality of UL CCs. A carrier indicator field (CIF) may be defined for the cross carrier scheduling. The CIF may be included in the DCI format which is transmitted on the PDCCH. Whether the CIF exists within the DCI format may be indicated by the higher layer semi-statically or UE-specifically. When the cross carrier scheduling is performed, the CIF may indicate the DL CC where the PDSCH is scheduled or the UL CC where the PUSCH is scheduled. The CIF may be fixed three bits, and may exist in a fixed position regardless of the DCI format size. When the CIF does not exist within the DCI format, the PDCCH on a specific DL CC may schedule the PDSCH on the same DL CC or schedule the PUSCH on the UL CC which has a SIB2 linkage with the specific DL CC. The cross carrier scheduling may be supported only by the USS.

When the cross carrier scheduling is performed using the CIF, the base station may allocate the PDCCH monitoring DL CC aggregation in order to reduce complexity of the blind decoding of the UE. The PDCCH monitoring DL CC aggregation is a part of the whole DL CC, and the UE performs blind decoding only for the PDCCH within the PDCCH monitoring DL CC aggregation. That is, in order to schedule the PDSCH and/or PUSCH for the UE, the base station may transmit the PDCCH only through the DL CC in the PDCCH monitoring DL CC aggregation. The PDCCH monitoring DL CC aggregation may be set UE-specifically, UE-group-specifically or cell-specifically.

Figure 7:
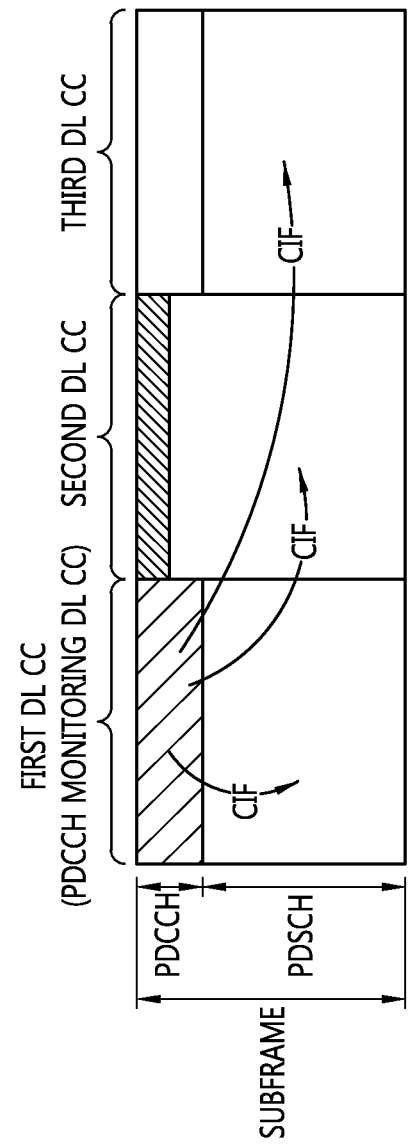
FIG. 7 shows an example of a subframe structure of 3GPP LTE-A system which is cross-carrier-scheduled through CIF.

FIG. 7 shows an example of a subframe structure of 3GPP LTE-A system which is cross-carrier-scheduled through CIF.

Referring to FIG. 7, a first DL CC among three DL CCs is set as a PDCCH monitoring DL CC. When the cross carrier scheduling is not performed, each DL CC schedules PDSCH by transmitting each PDCCH. When the cross carrier scheduling is performed, only the first DL CC which is set as the PDCCH monitoring DL CC transmits the PDCCH. The PDCCH which is transmitted on the first DL CC schedules the PDSCH of the second DL CC and the third DL CC by using CIF as well as the PDSCH of the first DL CC. The second DL CC and the third DL CC which are not set as the PDCCH monitoring DL CC do not transmit PDCCH.

Furthermore, the cross carrier scheduling is not supported in the PCell. That is, the PCell is always scheduled by its own PDCCH. The UL grant and DL assignment of the cell is always scheduled from the same cell. That is, if the DL in the cell is scheduled on the second carrier, the UL is also scheduled on the second carrier. The PDCCH order may be transmitted only on the PCell. Furthermore, frame timing, a super frame number (SFN) timing, etc, may be aligned in the aggregated cells.

The UE may monitor one CSS when the aggregation level is 4 or 8 on the PCell. The UE where the CIF has not been set monitors one USS when the aggregation level is one of 1, 2, 4, and 8 in each activated serving cell. As configured by the higher layer, the CIF-set UE monitors one or more USSs when the aggregation level is one of 1, 2, 4, and 8 on one or more activated serving cells. The CSS may overlap with the USS on the PCell.

The CIF-set UE associated with the PDCCH which is monitored in the serving cell of the serving cell and monitors the PDCCH including the CRC, which is scrambled by the C-RNTI and configured as the CIF, in the USS. The CIF-set UE associated with the PDCCH which is monitored in the PCell monitors the PDCCH including the CRC, which is scrambled by the SPS C-RNTI and configured as the CIF, in the USS of the PCell. Furthermore, the UE may monitor the PDCCH by searching the CSS without the CIF. For the serving cell on which the PDCCH is monitored, the UE in which the CIF has not been set monitors the USS without CIF for the PDCCH. The CIF-set UE monitors the USS through the CIF for the PDCCH. When configured to monitor the PDCCH in the SCell through the CIF in another serving cell, the UE may not monitor the PDCCH of the SCell.

In addition, the UE may transmit to the base station uplink control information including channel state information (CSI), the ACK/NACK signal, etc., received, detected, or measured from one or more DL CCs through one predetermined UL CC. The CSI may include a CQI, a PMI, an RI, etc. For example, when the UE needs to transmit an ACK/NACK signal regarding data received from a DL CC of a PCell and DL CCs of SCells, the UE may transmit to the base station a plurality of ACK/NACK signals regarding the data received from each DL CC through a PUCCH of a UL CC of the PCell by multiplexing or bundling the plurality of ACK/NACK signals.

Hereinafter, a method for transmitting CSI in a CA environment according to the present invention is described. In the description below, it is assumed that the CSI includes channel-related information such as CQI, PMI, RI, and a precoding type indicator (PTI).

The LTE rel-10 system provides two types of CSI: periodic CSI and aperiodic CSI. The UE may transmit periodic CSI at regular intervals on the PUCCH. The periodic CSI is configured semi-statically by a higher layer. The period of the periodic CSI may be set differently according to a periodic CSI reporting type, and may also be set differently for each configured serving cell.

The periodic CSI reporting type is as follows.
Type 1: CQI feedback for sub-bands selected by a UE
Type 1a: sub-band CQI and PMI feedback
Type 2, 2b, 2c: wideband CQI and PMI feedback
Type 2a: wideband PMI feedback
Type 3: RI feedback
Type 4: wideband CQI feedback Type 5: RI and wideband PMI feedback Type 6: RI and PTI feedback If one serving cell is configured and simultaneous transmission of the PUSCH and PUCCH is configured, a UE may transmit only the periodic CSI on a PUCCH format 2. If one serving cell is configured and simultaneous transmission of the PUSCH and PUCCH is configured and the UE does not transmit the PUSCH, the UE may transmit the periodic CSI and HARQ-ACK signal on PUCCH format 2/2a/2b. If one or more serving cells are configured and simultaneous transmission of the PUSCH and PUCCH is configured, the UE may transmit only the periodic CSI on PUCCH format 2.

Or, the UE may transmit aperiodic CSI on the PUSCH. In transmitting the aperiodic CSI, the RI may be transmitted only when the configured CSI feedback type supports transmission of the RI. Transmission of the aperiodic CSI may be indicated by a specific field of a UL DCI format or a random access response grant.

In general, the CSI has a lower priority than an SR or HARQ-ACK signal. Therefore, when simultaneous transmission of CSI and other uplink control information is needed, the CSI may in fact be dropped without being transmitted. Also, in the case of simultaneous transmission of the CSI among a plurality of configured serving cells, transmission of CSI of a specific serving cell may be dropped. Collision of aperiodic CSI with uplink control information may be minimized by scheduling of a base station.

However, the periodic CSI is transmitted only for a single cell in one subframe. Since each cell may employ different periods from the others, the periodic CSI may be dropped with a higher probability than the aperiodic CSI. For example, if simultaneous transmission of the PUSCH and PUCCH is not configured, and the periodic CSI is transmitted only for a single DL CC in one subframe, transmission of periodic CSI for the other DL CCs may be dropped. Or, if simultaneous transmission of the PUSCH and PUCCH is not configured, and a HARQ-ACK signal for a plurality of DL CCs and periodic CSI collide with each other on the PUCCH, transmission of the periodic CSI may be dropped. Or, if the periodic CSI and aperiodic CSI are transmitted in the same subframe, the UE may transmit only the aperiodic CSI and transmission of the periodic CSI may be dropped. Or, if the periodic CSI whose periodic CSI reporting type is 3, 5, or 6 collide with the periodic CSI whose periodic CSI reporting type 1, 1a, 2, 2a, 2b, 2c, or 4 in the same serving cell, transmission of the periodic CSI whose periodic CSI reporting type is 1, 1a, 2, 2a, 2b, 2c, or 4 may be dropped.

Since a base station becomes unable to know the most recent state of a DL channel if transmission of the CSI is dropped, scheduling reflecting a channel state such as a frequency position, modulation scheme, coding rate, and selection of a precoding matrix cannot be performed in a proper manner. Also, if new CSI is defined in a specification following the LTE rel-11 system, dropping of the periodic CSI may cause more severe problem.

Therefore, to minimize dropping of transmission of the periodic CSI, a method for transmitting periodic CSI through a PUSCH may be proposed. More specifically, a method for transmitting periodic CSI through a PUSCH based on a UL semi-persistent scheduling (SPS) may be proposed. While the conventional PUCCH format 2/2a/2b carrying the periodic CSI supports transmission of a maximum of 10 bits, a greater number of bits may be transmitted by transmitting the periodic CSI based on the UL SPS. There is a chance that multiplexing of the periodic CSI and additional control information is defined in the specifications following the LTE rel-11 system. Also, since the number of transmission bits becomes large, the periodic CSI for one or more configured serving cells may be multiplexed and transmitted simultaneously in one subframe. Also, the periodic CSI and the HARQ-ACK signal may be multiplexed and transmitted simultaneously based on the UL-SPS without dropping transmission of the periodic CSI as in the LTE rel-10 system even when simultaneous transmission of the periodic CSI and HARQ-ACK signal is needed.

SPS is allocated when periodic communication is needed, and may be allocated for voice over IP (VoIP) communication in most cases. The SPS may be configured by a higher layer. The SPS-Config information element (IE) transmitted through the higher layer may indicate an SPS configuration. Table 1 shows an example of the SPS-Config IE.

TABLE 1

```
SPS-Config ::= SEQUENCE {
    semiPersistSchedC-RNTI      C-RNTI          OPTIONAL,    - Need OR
    sps-ConfigDL                SPS-ConfigDL    OPTIONAL,    -- Need ON
    sps-ConfigUL                SPS-ConfigUL    OPTIONAL     -- Need ON
}
```

Referring to Table 1, the SPS-Config IE includes SPS C-RNTI parameter, SPS-ConfigDL IE, and SPS-ConfigUL IE. The SPS-ConfigDL IE indicates the SPS configuration in the DL. The SPS-ConfigUL indicates the SPS configuration in the UL. Table 2 shows an example of the SPS-ConfigDL IE.

TABLE 2

```
SPS-ConfigDL ::= CHOICE{
    release                         NULL,
    setup                           SEQUENCE {
        semiPersistSchedIntervalDL      ENUMERATED {
                                            sf10, sf20, sf32, sf40, sf64, sf80,
                                            sf128, sf160, sf320, sf640, spare6,
                                            spare5, spare4, spare3, spare2,
                                            spare1},
        numberOfConfSPS-Processes       INTEGER (1..8),
        n1-PUCCH-AN-PersistentList      N1-PUCCH-AN-PersistentList,
        ...,
    [[  twoAntennaPortActivated-r10     CHOICE {
            release                         NULL,
```

TABLE 2-continued

```
        setup                               SEQUENCE {
            n1-PUCCH-AN-PersistentListP1-r10    N1-PUCCH-AN-PersistentList
        }
    }                                       OPTIONAL -- Need ON
    ]]
    }
}
```

In Table 2, the semiPersistSchedIntervalDL parameter indicates the period of DL SPS. The period of DL SPS is indicated in units of subframes. In a TDD system, the period of DL SPS may use a value obtained by rounding off the semiPersistSchedIntervalDL parameter to the value nearest to the multiple of 10 subframes. For example, if the semiPersistSchedIntervalDL parameter is 64 sf in the TDD system, the period of DL SPS may be 60 sf rather than 64 sf. The numberOfConfSPS-Process parameter indicates the number of HARQ processes configured for the SPS. The n1-PUCCH-AN-PersistentList parameter and n1-PUCCH-AN-PersistentListP1 parameter indicate $n_{PUCCH}^{(1,p)}$ for the antenna port P0 and P1, respectively.

In the SPS-Config IE of Table 1, SPS-ConfigUL IE indicates the SPS configuration in the UL. Table 3 shows an example of the SPS-ConfigUL IE.

TABLE 3

```
SPS-ConfigUL ::= CHOICE{
    release                     NULL,
    setup                       SEQUENCE {
        semiPersistSchedIntervalUL  ENUMERATED {
                                        f10, sf20, sf32, sf40, sf64, sf80,
                                        sf128, sf160, sf320, sf640, spare6,
                                        spare5, spare4, spare3, spare2,
                                        spare1},
        implicitReleaseAfter        ENUMERATED {e2, e3, e4, e8},
        p0-Persistent               SEQUENCE {
            p0-NominalPUSCH-Persistent  INTEGER (-126..24),
            p0-UE-PUSCH-Persistent      INTEGER (-8..7)
        }                           OPTIONAL,          -- Need OP
        twoIntervalsConfig  ENUMERATED {true}  OPTIONAL,  -- Cond TDD
        ...
    }
}
```

In Table 3, the semiPersistSchedIntervalUL parameter indicates the period of UL SPS. The period of UL SPS is specified in units of subframes. In a TDD system, the period of UL SPS may use a value obtained by rounding off the semiPersistSchedIntervalUL parameter to the value nearest to the multiple of 10 subframes. For example, if the semiPersistSchedIntervalUL parameter is 64 sf in the TDD system, the period of UL SPS may be 60 sf rather than 64 sf. The implicitReleaseAfter parameter indicates the number of empty transmissions before implicit release.

Activation and release of SPS allocation may be performed by the PDCCH. The UE may validate an SPS allocation PDCCH if a CRC parity bits obtained from a PDCCH payload is scrambled with an SPS C-RNTI or a new data indicator field is set to 0. The UE, to detect allocation of a UL SPS session, performs blind decoding on the PDCCH for which the CRC is scrambled with the SPS C-RNTI. Blind decoding may be performed in a CSS or USS. Validation of the PDCCH may be performed when the fields of each DCI format are configured according to Tables 4 and 5. If validation of the PDCCH is performed, the UE may regard the received DCI format as valid activation or release of SPS allocation.

Table 4 shows the fields of a DCI format configured for activation of SPS allocation.

TABLE 4

| | DCI format 0 | DCI format 1/1A | DCI format 2/2A/2B/2C |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |

TABLE 4-continued

| | DCI format 0 | DCI format 1/1A | DCI format 2/2A/2B/2C |
|---|---|---|---|
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 5 shows the fields of a DCI format configured for release of SPS allocation.

TABLE 5

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |

TABLE 5-continued

| | DCI format 0 | DCI format 1A |
|---|---|---|
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

To transmit data on the UL-SCH, the UE needs to have a valid UL grant. The valid UL grant may be received dynamically on the PDCCH or within a random access response, or may be configured semi-persistently. To perform requested transmission, the MAC layer receives HARQ information from a lower layer. If the physical layer is configured for UL spatial multiplexing, the MAC layer may receive up to two grants in the same TTI from the lower layer. If the SPS is not configured, the corresponding grant or resources are discarded. The SPS may be supported only for a PCell. In other words, SPS cannot be allocated or employed for a SCell.

Also, the number of HARQ processes may be determined for the DL and UL in the FDD and TDD system. For example, in the FDD system, the maximum number of DL HARQ processes for each serving cell may be 8.

The HARQ process may also be applied to SPS for the DL and UL. In other words, the maximum number of HARQ processes for the DL and UL includes an HARQ process for SPS allocation. Therefore, if the UL SPS for transmission of the periodic CSI is allocated only to the PCell as in the LTE rel-10 system, allocation of different UL SPS may be restricted. For example, it is assumed that the maximum number of UL HARQ processes in the FDD system is 8. If the periodic CSI is transmitted through an SPS PUSCH for each of five configured serving cells, a total number of 5 UL SPSs are allocated. Since HARQ processes are applied to the 5 UL SPSs, only three UL HARQ processes are remained. If 2 UL SPSs are allocated additionally for VoIP communication, there is no other choice but to deal with allocation of UL SPS through a conventional, dynamic PDCCH by using the remaining, one UL HARQ process. In other words, the transmission of the periodic CSI based on the UL SPS supported only in the PCell may restrict the UL HARQ process of the UE.

Accordingly, the present invention provides a method for allocating a UL SPS session for transmission of the periodic CSI to the SCell. In the description below, the UL SPS session may be used together with an SPS C-RNTI or an SPS PUSCH. The UL SPS session may be allocated only to the SCell. At this time, if the CA is not configured, the periodic CSI cannot be transmitted through a PUSCH based on the UL SPS session allocated to the SCell. In other cases, the UL SPS session may be allocated to both of the PCell and the SCell. At this time, even when the CA is not configured, the periodic CSI may be transmitted through a PUSCH based on the UL SPS session. Meanwhile, although the present invention describes a method for transmitting the periodic CSI through a PUSCH based on the UL SPS session, the present invention is not limited thereto. Other data or control signal may be transmitted through a PUSCH based on the UL SPS session, and the UL SPS session allocated to a SCell may be allocated without specific limitations. Activation and release of allocation of the UL SPS session allocated to a SCell may be performed through the PDCCH in the same way as the method described above.

Figure 8:
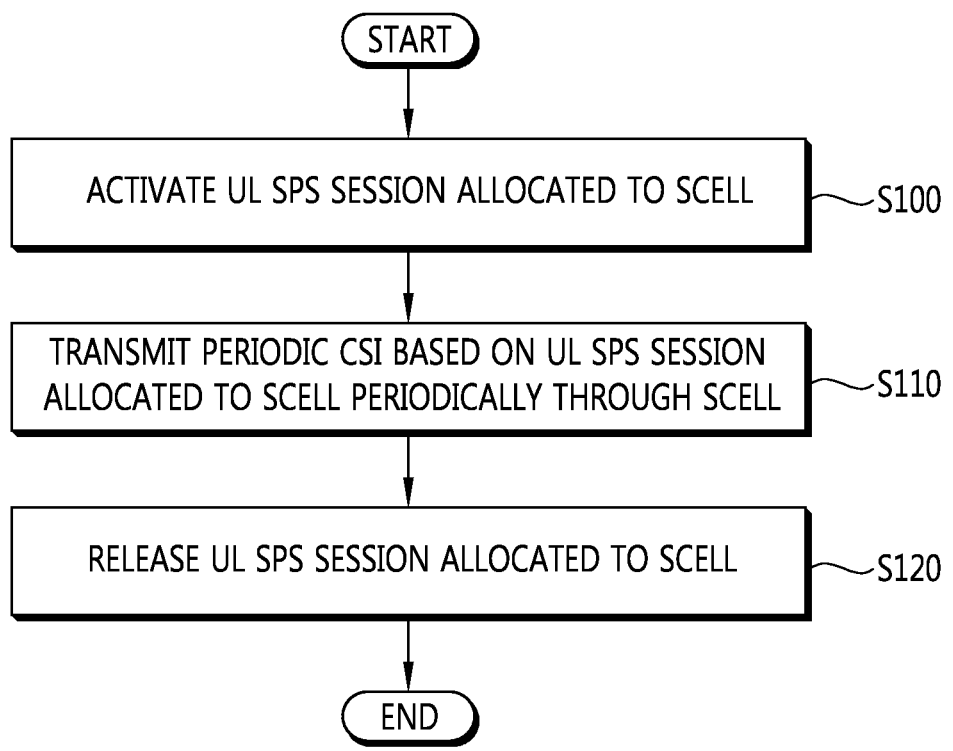
FIG. 8 shows an embodiment of a proposed method for transmitting periodic CSI.

FIG. 8 shows an embodiment of a proposed method for transmitting periodic CSI.

In step S100, the UE activates a UL SPS session allocated to a SCell. In step S110, the UE transmits periodic CSI periodically through a PUSCH based on the UL SPS session allocated to the SCell. In step S120, the UE releases the UL SPS session allocated to the SCell. Activation and release of the UL SPS session may be performed by blind decoding of a PDCCH.

Hereinafter, a method for indicating which specific UL SPS session is used to transmit the periodic CSI transmitted based on the UL SPS session.

1) The UL SPS session allocated to the SCell is always used only for transmission of the periodic CSI. At this time, there is no need for the base station to indicate a specific UL SPS session used for transmission of the periodic CSI.

2) The base station may indicate a specific UL SPS session used for transmission of the periodic CSI through the RRC. Where the specific UL SPS session used for transmission of the periodic CSI is located may be indicated through the RRC. For example, the base station may indicate a number of a subframe in which the specific UL SPS session used for transmission of the periodic CSI is activated through the RRC. Also, the base station may indicate a number of a subframe in which the specific UL SPS session used for transmission of the periodic CSI is released through RRC signaling. Similarly, whether to use the UL SPS session for transmission of the periodic CSI may be indicated through the RRC.

3) The base station may indicate a specific UL SPS session used for transmission of the periodic CSI through MAC. Where the specific UL SPS session used for transmission of the periodic CSI is located may be indicated through the MAC.

4) The base station may indicate a specific UL SPS session used for transmission of the periodic CSI through the physical layer (PHY). A DCI format which activates or releases the UL SPS session may have a field not used or reserved for later use. The base station, by using the field in the DCI format not used or reserved for later use, may indicate whether the periodic CSI is transmitted based on the specific UL SPS session. For example, if the value of the reserved field is 1, it indicates that the periodic CSI is transmitted based on the UL SPS session while the value of the reserved field is 0, it indicates that the periodic CSI is not transmitted based on the UL SPS session.

5) The base station may indicate a specific UL SPS session used for transmission of the periodic CSI through an RNTI. At this time, in addition to an SPS C-RNTI used for activation of an existing UL SPS session, a new RNTI may be allocated for transmission of the periodic CSI, which is called a CSI-SPS C-RNTI. The base station allocates a CSI-SPS C-RNTI to the UE. The UE may perform blind decoding of a PDCCH scrambled with the CSI-SPS C-RNTI in the search space, and if the transmitted PDCCH is detected, the UE may regard the detected PDCCH as a UL SPS session for transmission of the periodic CSI.

Meanwhile, if the periodic CSI is transmitted through the PUSCH based on the UL SPS session, different SPS parameters from existing SPS parameters may be applied. For example, the SPS period may be applied differently. As described in Table 3, the existing SPS period may be determined by one of {sf10, sf20, sf32, sf40, sf64, sf80, sf128, sf160, sf320, sf640, spare6, spare5, spare4, spare3, spare2, spare1} by the semiPersistSchedIntervalUL parameter. If such an SPS period is applied directly to the UL SPS session for transmission of the periodic CSI, restriction may occur in allocating a period. Accordingly, a new period, which takes account of the period of the periodic CSI, may be allocated newly to the remaining part (spare6, spare5, spare4, spare3, spare2, spare1) of the semiPersistSchedIntervalUL parameter. The new period may be sf2, sf5, etc. Or, a new SPS parameter (semiPersistSchedIntervalULCSI) indicating a different SPS period may be defined. Accordingly, an existing semiPersistSchedIntervalUL parameter may be used or a newly defined semiPersistSchedIntervalULCSI parameter may be used according to whether the UL SPS session is used for transmission of the periodic CSI.

Hereinafter, a method for indicating a cell for which the periodic CSI transmitted based on the UL SPS session is intended is described.

1) A UL SPS session allocated to a SCell may be used for transmission of the periodic CSI for itself having SIB-2 linkage. At this time, there is no need for the base station to indicate separately for which cell transmission of the periodic CSI is intended.

2) The base station may indicate the cell for which the periodic CSI transmitted based on the UL SPS session is intended through the RRC. For example, the base station may indicate a serving cell index such as a CIF through the RRC.

3) The base station may indicate the cell for which the periodic CSI transmitted based on the UL SPS session is intended through the MAC. For example, the base station may indicate a serving cell index such as a CIF through the MAC.

4) The base station may indicate the cell for which the periodic CSI transmitted based on the UL SPS session is intended through the PHY. A DCI format which activates or releases the UL SPS session may have a field not used or reserved for later use. The base station, by using the field in the DCI format not used or reserved for later use, may indicate the cell for which the periodic CSI transmitted based on the UL SPS session is intended. For example, by using reserved three bits, a serving cell index such as a CIF may be indicated.

5) By configuring different RNTIs for SPS separately for each cell, it may be determined for which cell the periodic CSI transmitted based on the UL SPS session is intended. For example, if the periodic CSI uses an existing SPS C-RNTI, by configuring the SPS C-RNTI separately for each cell, it may be determined for which cell the UL SPS session is intended. Similarly, if the periodic CSI uses a newly defined CSI-SPS C-RNTI, by configuring the CSI-SPS C-RNTI separately for each cell, it may be determined for which cell the UL SPS session is intended.

The SPS C-RNTI allocated to the SCell or the newly defined CSI-SPS C-RNTI described above may be used in the same way as the existing SPS C-RNTI allocated to the PCell. To prevent collision between cells or UEs, however, the SPS C-RNTI or CSI-SPS C-RNTI may be allocated separately for each cell. Likewise, two types of SPS C-RNTI (or CSI-SPS C-RNTI) comprising SPS C-RNTI (or CSI-SPS C-RNTI) used for PCells and SPS C-RNTI (or CSI-SPS C-RNTI) used for SCells may be allocated.

Hereinafter, transmission and detection of a PDCCH for activation and release of a UL SPS allocation is described. More specifically, activation and release of UL SPS allocation according to application of cross carrier scheduling is described. For the sake of convenience, only the activation of UL SPS allocation is described below, however, descriptions below may be applied the same for the case of release of UL SPS allocation. Also, descriptions below may be applied irrespective of whether a UL SPS session for transmission of the periodic CSI uses an SPS C-RNTI or a newly defined CSI-SPS C-RNTI. In other words, the type of an RNTI used is not limited in the following description.

If cross carrier scheduling is not configured for a SCell, a CIF is not defined, and a PDCCH may be allocated only to a USS. The DCI format activating a UL SPS session may be transmitted through a PDCCH allocated to a USS of the SCell. Since the DCI format does not have a CIF, part of unused or reserved fields may be used to indicate the CIF. Similarly, the base station may define a CSS in the SCell and transmit a DCI format activating a UL SPS session through a PDCCH allocated to the CSS of the SCell. Also, the DCI format activating the UL SPS session may be transmitted through a PDCCH allocated the USS and the CSS of the SCell.

In case cross carrier scheduling is configured, a DCI format activating a UL SPS session allocated to a SCell may be transmitted through a PDCCH of a PCell. At this time, the DCI format may be transmitted along with a CIF through a PDCCH allocated only to a USS of the PCell. Similarly, the DCI format may be transmitted along with a CIF through a PDCCH allocated to the CSS and the USS of the PCell. At this time, the DCI format transmitted through the PDCCH allocated to the USS has a CIF, but the DCI format transmitted through the PDCCH allocated to the CSS does not have a CIF. Therefore, part of unused or reserved fields may be used to indicate the CIF. As described above, re-using part of unused or reserved fields may be applied only to the CSS or can be applied the same for both of the CSS and USS.

If cross carrier scheduling is configured, a DCI format activating a UL SPS session allocated to a SCell may be transmitted through a PDCCH of a different SCell. At this time, the DCI format may be transmitted along with a CIF through a PDCCH allocated only to a USS of the different SCell. Similarly, the base station may define a CSS in the different SCell and transmit a DCI format activating a UL SPS session through a PDCCH allocated to a CSS of the different SCell. Also, the DCI format activating a UL SPS session may be transmitted through a PDCCH allocated to a USS and a CSS of the different SCell.

Activation of UL SPS allocation according to application of cross carrier scheduling is now described with specific examples.

1) A plurality of UL CCs may use the same SPS C-RNTI. In other words, the SPS C-RNTI used in a PCell is shared by all of configured serving cells. The SPS C-RNTI may be a UE-specific parameter. To distinguish for which cell the allocated UL SPS session is, if cross carrier scheduling is configured, the base station may transmit a DCI format activating a UL SPS session through a PDCCH allocated to a USS. In general, it is not possible to transmit a DCI format activating a UL SPS session through a PDCCH allocated to a CSS, however, to support the transmission, unused or reserved fields within the DCI format may be used to represent the CIF. If cross carrier scheduling is not configured, the UE may allocate a UL SPS session for a UL CC having an SIB2 linkage with a DL CC to which a PDCCH is allocated.

2) A plurality of UL CCs may use different SPS C-RNTIs each other. At this time, an SPS C-RNTI may be a cell-specific parameter. To distinguish for which cell the allocated UL SPS session is, if cross carrier scheduling is configured, the base station may transmit a DCI format activating a UL SPS session through a PDCCH allocated to a USS. In general, it is not possible to transmit a DCI format activating a UL SPS session through a PDCCH allocated to a CSS, however, to support the transmission, unused or reserved fields within the DCI format may be used to represent the CIF. If cross carrier scheduling is not configured, the UE may allocate a UL SPS session for a UL CC having an SIB2 linkage with a DL CC to which a PDCCH is allocated.

3) A plurality of UL CCs may use different SPS C-RNTIs each other. At this time, an SPS C-RNTI may be a cell-specific parameter. The UE, based on a detected SPS C-RNTI, may know for which cell the allocated UL SPS session is.

In the descriptions above, an SPS C-RNTI was used to illustrate the present invention, however, the descriptions may be applied the same for the case of using a CSI-SPS C-RNTI. In other words, in the descriptions above, an SPS C-RNTI can be replaced with a CSI-SPS C-RNTI.

Meanwhile, if a UL SPS session is used for transmission of the periodic CSI, an HARQ process may be omitted. In other words, if a UL SPS session is used for transmission of the periodic CSI, the UE does not allocate an HARQ process for the UL SPS session, and does not wait for transmission of an HARQ-ACK signal through a physical HARQ indicator channel (PHICH) for the UL SPS session. If the base station transmits a DCI format for activating a UL SPS session through a PDCCH, or the base station transmits a DCI format for activating a UL SPS session of a SCell through a PDCCH allocated to a PCell, or the base station transmits a DCI format for activating a UL SPS session of a SCell through a PDCCH allocated to a different SCell the UE, instead of allocating an HARQ process for the UL SPS session, the UE considers that an NDI bit for the corresponding HARQ process has been toggled. Also, the UE transmits a configured UL grant and HARQ information associated with the configured UL grant to an HARQ entity. However, to simplify the operation of the UE, it is still possible for all of the UL SPS sessions to allocate an HARQ process as in an existing method.

Figure 9:
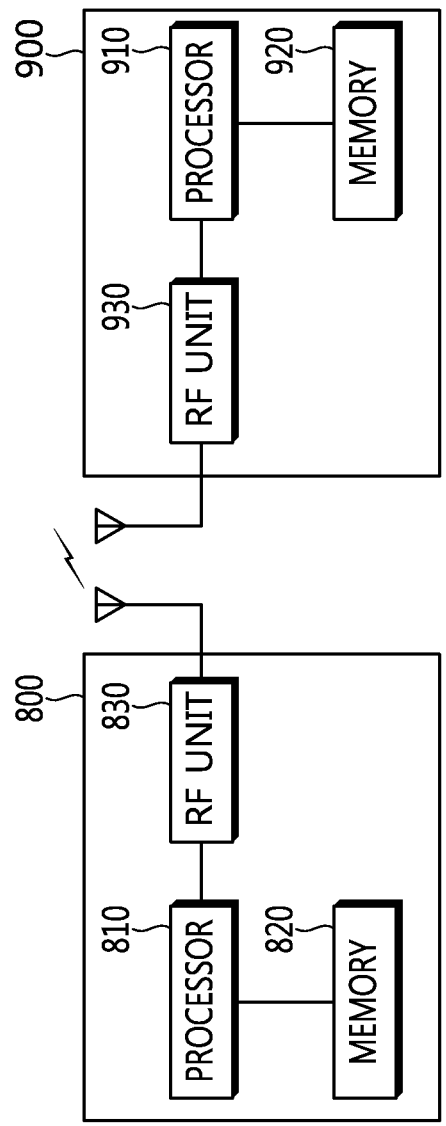
FIG. 9 is a block diagram showing wireless communication system to implement an embodiment of the present invention.

FIG. 9 is a block diagram showing wireless communication system to implement an embodiment of the present invention.

A base station 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A user equipment 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a user equipment (UE), periodic channel state information (CSI) in a wireless communication system, the method comprising:
    activating an uplink (UL) semi-persistent scheduling (SPS) session allocated to a secondary cell (SCell) by receiving a downlink control information (DCI) format which is cyclic redundancy check (CRC)-scrambled with a SPS cell radio network temporary identifier (SPS C-RNTI) or a CSI-SPS C-RNTI through a physical downlink control channel (PDCCH) and by detecting the UL SPS session using blind decoding of the DCI format;
    transmitting periodic CSI to a base station periodically through a physical uplink shared channel (PUSCH) based on the UL SPS session allocated to the SCell; and
    releasing the UL SPS session allocated to the SCell,
    wherein the SCell and a primary cell (PCell) configures a carrier aggregation (CA) system,
    wherein the PCell is a cell in which the UE performs a radio resource control (RRC) connection with the base station,
    wherein the SCell is at least one cell from among the remaining cells excluding the PCell in the carrier aggregation system,
    wherein the UL SPS session is indicated based on a CSI SPS C-RNTI allocated by the base station only for semi-persistent scheduling transmission of the periodic CSI,
    wherein the UL SPS session is scheduled by a radio resource control (RRC) signaling based on a transmission period of the periodic CSI,
    wherein the CSI SPS C-RNTI is configured as different value according to whether an UL SPS session for a periodic CSI is allocated on the PCell or the SCell, and
    wherein if cross carrier scheduling is configured, the DCI format is received through a UE-specific search space (USS) of the PCell or a USS of another SCell which is different from the SCell.

2. The method of claim 1, wherein a subframe in which the UL SPS session allocated to the SCell is activated or released is indicated.

3. The method of claim 1, wherein the periodic CSI is information on the SCell having a system information block (SIB)-2 linkage.

4. The method of claim 1, wherein the periodic CSI is information on a cell indicated by an RRC signaling, a MAC signaling, or a PHY signaling.

5. The method of claim 1, wherein the periodic CSI is information on a cell corresponding to an SPS C-RNTI or CSI-SPS C-RNTI allocated for each cell.

6. The method of claim 1, wherein if cross carrier scheduling is not configured, the DCI format is received through a USS of the SCell, and wherein the DCI format includes a carrier indicator field (CIF).

7. The method of claim 1, wherein if cross carrier scheduling is not configured, the DCI format is received through a common search space (CSS) defined in the SCell.

8. The method of claim 1, wherein the releasing the UL SPS session comprises:

receiving a DCI format which is CRC-scrambled with an SPS C-RNTI or CSI-SPS C-RNTI through a PDCCH; and detecting the UL SPS session by blind decoding of the DCI format.

9. The method of claim 1, wherein the PCell is a cell providing at least one of non-access stratum (NAS) mobility information and security input at the time of RRC establishment, RRC re-establishment, or handover.

10. A user equipment (UE) for transmitting periodic channel state information (CSI) in a wireless communication system, the UE comprising:

a radio frequency (RF) unit for transmitting or receiving a radio signal; and a processor connected to the RF unit that:

activates an uplink (UL) semi-persistent scheduling (SPS) allocated to a secondary cell (SCell) by receiving a downlink control information (DCI) format which is cyclic redundancy check (CRC)-scrambled with a SPS cell radio network temporary identifier (SPS C-RNTI) or a CSI-SPS C-RNTI through a physical downlink control channel (PDCCH) and by detecting the UL SPS session using blind decoding of the DCI format;

transmits periodic CSI to a base station periodically through a physical uplink shared channel (PUSCH) based on the UL SPS session allocated to the SCell; and releases the UL SPS session allocated to the SCell, wherein the SCell and a primary cell (PCell) configures a carrier aggregation (CA) system, wherein the PCell is a cell in which the UE performs a radio resource control (RRC) connection with the base station, wherein the SCell is at least one cell from among the remaining cells excluding the PCell in the carrier aggregation system, wherein the UL SPS session is indicated based on a CSI SPS cell ratio network temporary identifier (CSI SPS C-RNTI) allocated by the base station only for semi-persistent scheduling transmission of the periodic CSI, wherein the UL SPS session is scheduled by a radio resource control (RRC) signaling based on a transmission period of the periodic CSI, wherein the CSI SPS C-RNTI is configured as different value according to whether an UL SPS session for a periodic CSI is allocated on the PCell or the SCell, and wherein if cross carrier scheduling is configured, the DCI format is received through a UE-specific search space (USS) of the PCell or a USS of another SCell which is different from the SCell.

\* \* \* \* \*